April 13, 1943.  D. G. C. HARE  2,316,239
METHOD AND APPARATUS FOR DETERMINING DENSITY OF FLUIDS
Filed Aug. 20, 1941
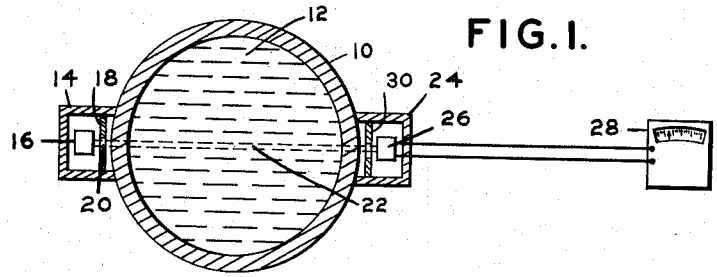
FIG.1.
FIG.2.
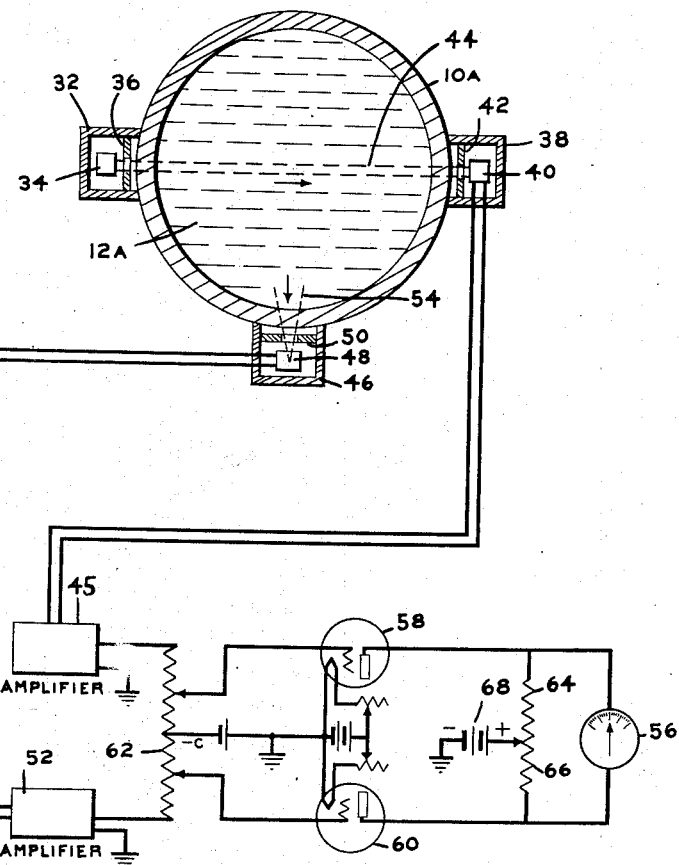
D.G.C. HARE
INVENTOR
BY
HIS ATTORNEYS Patented Apr. 13, 1943

2,316,239

UNITED STATES PATENT OFFICE 2,316,239

METHOD AND APPARATUS FOR DETERMINING DENSITY OF FLUIDS

Donald G. C. Hare, Houston, Tex., assignor, by mesne assignments, to The Texas Company, New York, N. Y., a corporation of Delaware Application August 20, 1941, Serial No. 407,607

5 Claims. (Cl. 250—83.6)

This invention relates to a method and an apparatus for determining the density or specific gravity of fluids and more particularly to the determination of the density of inaccessible fluids, such as those within a closed container or a pipe line and which fluids may be subjected to conditions of high temperature or pressure.

The primary purpose of the invention is to provide a method and an apparatus of this type which will give an accurate indication of the density or specific gravity of an inaccessible fluid without the necessity of any direct contact with the fluid or the positioning of any device or apparatus within the container.

It is frequently desirable to know accurately the specific gravity or density of a fluid in a container under high temperature or pressure conditions and which may or may not be in a state of flow as through a pipe line. This is of particular interest in certain processes such as in petroleum refining or treating operations in which the density of the fluid must be continuously controlled in order to prevent coking. In the past it has been necessary to take samples of the fluid from time to time so as to make gravity tests, or to provide some form of apparatus within the path of flow of the fluid, which apparatus will provide an indication of variations in density. In accordance with the present invention a determination may be made quickly, and with a high degree of accuracy, of the density of a fluid or a fluid mixture without necessitating any access to the interior of the container or pipe holding the fluid.

In my co-pending application, Serial No. 337,865, filed May 29, 1940, a method and an apparatus are disclosed for determining variations in density of a fluid. In accordance with that invention an instrument containing a source of penetrative radiation and a detector of radiation scattered within the fluid and returned outwardly of the container is adapted to be placed against or in close proximity to the wall of the container or pipe. The scattering of the radiation within the fluid which is similar to diffuse reflection will cause some of the radiation to return to the detector and the amount of scattering which takes place in a given volume of substance is a function of the density of the scattering material. Thus, assuming a change in the density of a fluid passing, for instance, through a pipe, a change in the amount of radiation scattered within the fluid and returned to the detector will occur, and a suitable meter attached to the detector will indicate such a change in density of the fluid. As the density increases the amount of scattered radiation will increase and in this manner a direct measurement may be made of the fluid density.

In accordance with the present invention the principle of absorption of radiation by the fluid within the container or pipe is utilized and a beam of penetrative radiation is directed into and through a portion of the container to a detector disposed outside of the container and in the path of radiation, the detector being associated with an instrument for indicating the amount of radiation transmitted through the container or, conversely, the amount of the radiation absorbed by the contents of the container. The detector may, of course, be associated with a recording device which will provide a continuous record of variations in density of the fluid within the container or pipe, or with a control device which will regulate some quantity such as fuel passing to a burner.

The intensity of any radiation passing through matter will be diminished by the absorption of the radiation in the matter. This absorption is usually exponential in nature and a very definite function of the density of the matter. Thus, a denser material will absorb a larger fraction of the radiation passing through a unit length than will a lighter material. On the other hand, it is generally true that a dense fluid will scatter more radiation than will a lighter fluid. The present invention also includes a method and an apparatus by means of which this differential effect is utilized to increase the sensitivity. In this differential method radiation from a source is directed into the fluid which may be passing, for instance, through a pipe, and a detector disposed in the path of the radiation picks up transmitted radiation in an amount depending upon the density of the fluid. At the same time another detector picks up radiation scattered within the fluid and these two detectors are connected through an electrical circuit to a single meter in a manner such that a simultaneous increase and decrease in the two detectors will cause the meter to provide an indication which will be greater than would be provided from the response of either of the detectors alone.

For a better understanding of the invention reference may be had to the accompanying drawing in which:

Fig. 1 is a vertical sectional elevation through a pipe carrying a fluid and showing an apparatus utilizing the "transmission or absorption" method, while Fig. 2 is a partially diagrammatic sectional elevation of an apparatus utilizing the "differential" method and an associated electrical circuit by means of which changes in both the scattered and absorbed radiation are determined simultaneously to indicate the density or variations in density of the fluid.

With reference to the drawing, a container such as a pipe is shown in Fig. 1 in cross-section and as containing a fluid 12 which may be a liquid or a gas or a liquid-gas mixture. A housing 14 containing a source 16 of penetrative radiation and which may be a compound of radium is adapted to be placed against or in close proximity to the outer surface of the pipe 10. A collimating system which may be a lead shield 18 containing a small opening 20 is arranged so as to allow a beam of radiation 22 to pass outwardly of the housing 14 and into the interior of the pipe 10. A second housing 24 containing a radiation detector 26 is adapted to be placed near or against the outer surface of the pipe 10 in the path of the radiation 22 and the detector 26 is preferably connected electrically to a suitable indicating instrument or meter 28. A lead shield 30 similar to the member 18 serves to confine the radiation picked up by the detector 26 to that transmitted directly through the contents of the pipe. As the density or specific gravity of the fluid 12 varies, there will be a corresponding variation in the amount of radiation absorbed within the fluid and a consequent variation in the amount of radiation picked up by the detector 26. The meter 28 will, therefore, provide a continuous indication of variations in density of the fluid 12.

In Fig. 2 apparatus for carrying out the "differential" method is illustrated in connection with a pipe 10a containing a fluid 12a. A housing 32 containing a source 34 of penetrative radiation and a shield member 36 corresponding respectively to the elements 14, 16 and 18 of Fig. 1 is adapted to be placed near or against the outer surface of the pipe 10a and the shield 36 is disposed so as to direct radiation from the source 34 into the interior of the pipe. A second housing 38 containing a detector 40 of transmitted radiation and a shield 42 is adapted to be placed against or near the outer surface of the pipe 10a in the path of the radiation 44 from the source 34. The shield 42 permits that portion of the radiation 44 transmitted directly through the contents of the pipe 10a to strike the detector 40. So far this is substantially the same arrangement as is shown in Fig. 1 with the exception that the detector 40 is connected electrically with an amplifier 45 or other device whose function is to make the response of the detector suitable for utilization in the circuit which will be described.

A third housing 46 containing a radiation detector 48 and a shield 50 is also adapted to be placed near or against the outer surface of the pipe 10a but in a position away from the path of the beam of radiation 44. The detector 48 is connected electrically to an amplifier or other device 52 similar to the device 45. Part of the radiation 44 from the source 34 will be transmitted through the fluid 12a so as to reach the detector 40, the amount of this transmitted radiation depending upon the density of the fluid through which it passes. Part of the radiation 44 will be scattered within the fluid 12a and some of this radiation shown by the dotted lines 54 will reach the detector 48, the amount of this scattered radiation also depending upon the density of the fluid. As has been explained hereinbefore, as the density of the fluid 12a inincreases, the amount of scattered radiation 54 will increase, while the transmitted radiation reaching the detector 40 will decrease.

The amplifiers 45 and 52 are connected to a vacuum tube circuit of the two-tube, push-pull amplifier type in which a meter 56 is connected across the plates of the tubes 58 and 60. The output circuits of the amplifiers 45 and 52 include a potentiometer 62 and a pair of load resistors 64 and 66 are connected between the plates of the tubes and a source of positive potential 68. As long as the plate of the tube 58 has the same potential as the plate of tube 60, the meter 56 will read zero. By varying the ratio of resistances 64 and 66, this condition can always be obtained as long as the inputs to the grids of tubes 58 and 60 are kept within certain reasonable limits. Changing the potential on the grids of both of tubes 58 and 60 by the same amount will cause no change in the meter reading. If, however, the potential of the grid of one of the tubes such as 58 is changed relative to the grid of the other tube 60, the plates of these tubes will be at different relative potentials than before and this change will be indicated by the meter 56. When the grid potentials are changed in opposite directions as by the output of detector 40 increasing while that of detector 48 decreases, there will be a relatively large change in the reading of the meter 56.

There are several advantages to this differential method. For instance, fluctuations in the intensity of the source of radiation will, to a high approximation, have no effect on the reading of the meter, since both detectors 40 and 48 will be affected equally and in the same direction. Similarly, fluctuations in the various voltage supplies necessary for the operation of such a device could be made negligible.

Although the invention has been described in connection with the measuring of the density of a fluid, other applications are, of course, contemplated as within the scope of this invention. For instance, in temperature control where the density of a fluid varies with its temperature the meter 28 or the meter 56 could obviously be replaced by a device for controlling some variable, such as the amount of fuel to be burned in the system so as to maintain constant the temperature of the fluid in the pipe or container.

Obviously many modifications and variations of the invention, as hereinbefore set forth, may be made without departing from the spirit and scope thereof and, therefore, only such limitations should be imposed as are indicated in the appended claims.

I claim:

1. The method of determining the density of an inaccessible fluid within a container, which comprises directing a beam of penetrative radiation from a source into the fluid in the container wherein some of the radiation is absorbed by the fluid while some is scattered in the fluid, detecting radiation transmitted through the fluid, detecting radiation scattered in the fluid and returned outwardly through said container, and simultaneously measuring the amount of transmitted and scattered radiation.

2. The method of determining variations in the density of a fluid passing through a pipe, which comprises directing a beam of penetrative radiation from a source into the fluid passing through said pipe, detecting radiation transmitted through the pipe and fluid to a point outside said pipe and away from said source, detecting radiation scattered in said fluid and returned to the outside of said pipe, and simultaneously measuring the amount of said transmitted and said scattered radiation.

3. The method of determining the density of an inaccessible fluid within a container, which comprises directing a beam of penetrative radiation from a source of radiation into the fluid in the container wherein some of the radiation is absorbed by the fluid, and some of the radiation is scattered in the fluid, detecting radiation transmitted through the fluid to the outside of said container, detecting radiation scattered in the fluid and returned to a point outside said container between said source and the first mentioned detector and simultaneously measuring the amount of transmitted and scattered radiation.

4. A device for determining the density or specific gravity of a fluid within a vessel, comprising a housing adapted to be placed near the outer surface of the wall of the vessel, a source of penetrative radiation within said housing, means for directing a beam of said radiation from said source through the vessel wall and into said fluid whereby some of the radiation will be returned outwardly of said vessel by the diffused reflection or scattering of the radiation in said fluid while some of the radiation will be absorbed by the fluid, a device within said housing for detecting scattered radiation, a device disposed at substantially the opposite side of said pipe from said source for detecting radiation transmitted through said pipe and fluid, and an instrument connected to said detectors for indicating variations in density of the fluid flowing through said pipe.

5. A device for determining the density or specific gravity of a fluid within a vessel, comprising a housing adapted to be placed near the outer surface of the wall of the vessel, a source of penetrative radiation within said housing, means for directing a beam of said radiation from said source through the vessel wall and into said fluid, whereby some of the radiation will be absorbed by said fluid while some will be scattered by the fluid and returned outside said pipe, a device for detecting radiation transmitted through said pipe and liquid, a second device for detecting radiation scattered in said fluid and returned outside said pipe and means responsive to the output of both of said detecting devices for measuring the density of the fluid in said pipe.

DONALD G. C. HARE.